United States Patent [19]

Riley et al.

[11] Patent Number: 5,546,825

[45] Date of Patent: Aug. 20, 1996

[54] CHANGE GEAR TRANSMISSION AND SHIFT ROD INTERLOCK THEREFOR

[75] Inventors: Thomas N. Riley, Portage, Mich.; Philip A. Morris, Manchester, England

[73] Assignee: Eaton Corporation, Cleveland, Ohio

[21] Appl. No.: 355,358

[22] Filed: Dec. 13, 1994

[51] Int. Cl.⁶ .................................. F16H 61/18
[52] U.S. Cl. .................................................. 74/477
[58] Field of Search ................... 74/477, 475, 471 R

[56] References Cited

U.S. PATENT DOCUMENTS

| | | | |
|---|---|---|---|
| 2,317,761 | 4/1943 | Haigh | 74/477 |
| 2,438,691 | 3/1948 | Armantrout | 74/477 |
| 2,512,036 | 6/1950 | Orr | 74/477 |
| 3,354,741 | 11/1967 | Johnston, Jr. et al. | 74/477 |
| 4,445,393 | 5/1984 | Braun | 74/346 |
| 4,754,665 | 7/1988 | Vandervoort | 74/745 |
| 4,920,815 | 5/1990 | Reynolds | 74/335 |
| 4,944,197 | 7/1990 | Stine | 74/477 |
| 4,974,474 | 12/1990 | Newbigging | 74/867 |
| 5,216,931 | 6/1993 | Hirsch et al. | 74/477 |
| 5,284,065 | 2/1994 | Loeffler et al. | 74/475 |

*Primary Examiner*—Charles A. Marmor
*Assistant Examiner*—David Fenstermacher
*Attorney, Agent, or Firm*—L. J. Kasper; Howard D. Gordon

[57] ABSTRACT

A compound change gear transmission (11) of the type including a multiple speed ratio main transmission section (15) and an auxiliary transmission section (17), and a shift rod (83) to engage selected main section gear ratios, and a shift rod (85) to engage selected auxiliary gear ratios. An interlock assembly (91) is included of the type having an interlock pin member (103), which normally prevents axial movement of either shift rod when the other is displaced. The shift rod (83) for the main transmission section has an interlock deactivation position corresponding to a non-neutral, predetermined gear ratio of the main section. The shift rod (83) defines an interlock recess (105) which receives the interlock pin (103) when the shift rod is in the interlock deactivation position, thus permitting simultaneous axial movement of the shift rod (85) for the auxiliary section.

4 Claims, 3 Drawing Sheets

CHANGE GEAR TRANSMISSION AND SHIFT ROD INTERLOCK THEREFOR

BACKGROUND OF THE DISCLOSURE

The present invention relates to compound transmissions having a multiple speed ratio main transmission section connected in series with a multiple speed ratio auxiliary transmission section, and more particularly, to such transmissions having shift rail interlock mechanisms.

Compound mechanical change gear transmissions comprising manually shifted multiple speed ratio main transmission sections connected in series with one or more auxiliary sections, usually of the range, splitter, or combined range/splitter type are well known in the prior art. The auxiliary sections are usually input and/or output auxiliary transmission sections, but within the scope of the present invention, may also comprise other devices, such as transfer cases or multiple speed drive axles. Examples of such compound transmission systems may be seen by reference to U.S. Pat. Nos. 4,754,665 and 4,944,197, both of which are assigned to the assignee of the present invention and incorporated herein by reference.

As is well-known to those skilled in the art, it is necessary to provide some sort of interlock mechanism between the main and auxiliary transmission sections, to retain the main transmission section in neutral during a range auxiliary section shift transient and/or to prevent/inhibit shifting of the auxiliary section when the main section is not in neutral. An example of a range interlock mechanism is illustrated and described in above-incorporated U.S. Pat. No. 4,944,197, and also in U.S. Pat. No. 4,445,393, assigned to the assignee of the present invention and incorporated herein by reference.

Although the prior art interlock mechanisms have operated generally satisfactory in regard to the basic interlock function, there have been certain operating conditions in which the known interlock mechanisms have not been totally satisfactory. By way of example, in a compound transmission in which the auxiliary section is of the combined range/splitter type, a problem arises when the operator shuts down the vehicle with the transmission in a relatively high gear (for example, sixteenth gear on a sixteen forward speed transmission). This necessarily requires that the range/splitter auxiliary section be in its "high/high" condition. Later (for example, the next morning), when the operator resumes operation of the vehicle and tries to shift the transmission to a lower gear it may be possible to shift the transmission "down" only as far as ninth gear (i.e., the lowest gear in the "high" range ), because the interlock mechanism prevents a range shift (i.e., from the high range to the low range). Typically, the range shift cannot be made without rotation of the main shaft, which will cause unblocking of the synchronizer in the auxiliary section, to permit shifting of the auxiliary section from the high range to the low range. This is especially true after a shutdown period when the oil in the transmission is cold and thick, and there is a tendency for the synchronizer to get "hung up" on the low blocker.

SUMMARY OF THE INVENTION

Accordingly, it is an object of the present invention to provide an improved compound change gear transmission which facilitates shifting of an auxiliary section in a situation in which the interlock mechanism would otherwise prevent such a shift.

It is a more specific object of the present invention to provide such an improved compound change gear transmission which permits a certain amount of rotation of the main shaft, to facilitate a shift within the auxiliary section, in a situation in which the interlock mechanism is in engagement.

The above and other objects of the invention are accomplished by the provision of an improved compound change gear transmission of the type including a multiple speed ratio main transmission section and an auxiliary transmission section connected in series. The main transmission section comprises a shift control assembly therefore, including at least a first shift rod axially moveable therein from a neutral, non-displaced position to engage and disengage, respectively, selected main transmission section gear ratios. The auxiliary transmission section includes at least a second shift rod axially moveable therein to engage and disengage selected auxiliary transmission section gear ratios. A shift rod interlock assembly is included of the type having an interlock pin member operable between a first position engaging the first shift rod and preventing axial movement thereof from the axially nondisplaced position while permitting axial movement of the second shift rod, and a second position engaging the second shift rod and preventing axial movement thereof while permitting axial movement of the first shift rod.

The improved transmission is characterized by the first shift rod having at least one normal position and an interlock deactivation position, corresponding to a non-neutral, predetermined gear ratio of the main transmission section. The first shift rod defines an interlock recess disposed to receive therein the interlock pin member when the first shift rod is in the interlock deactivation position and the displaced position, thereby also permitting axial movement of the second shift rod.

DESCRIPTION OF THE PREFERRED EMBODIMENT

Figure 1:
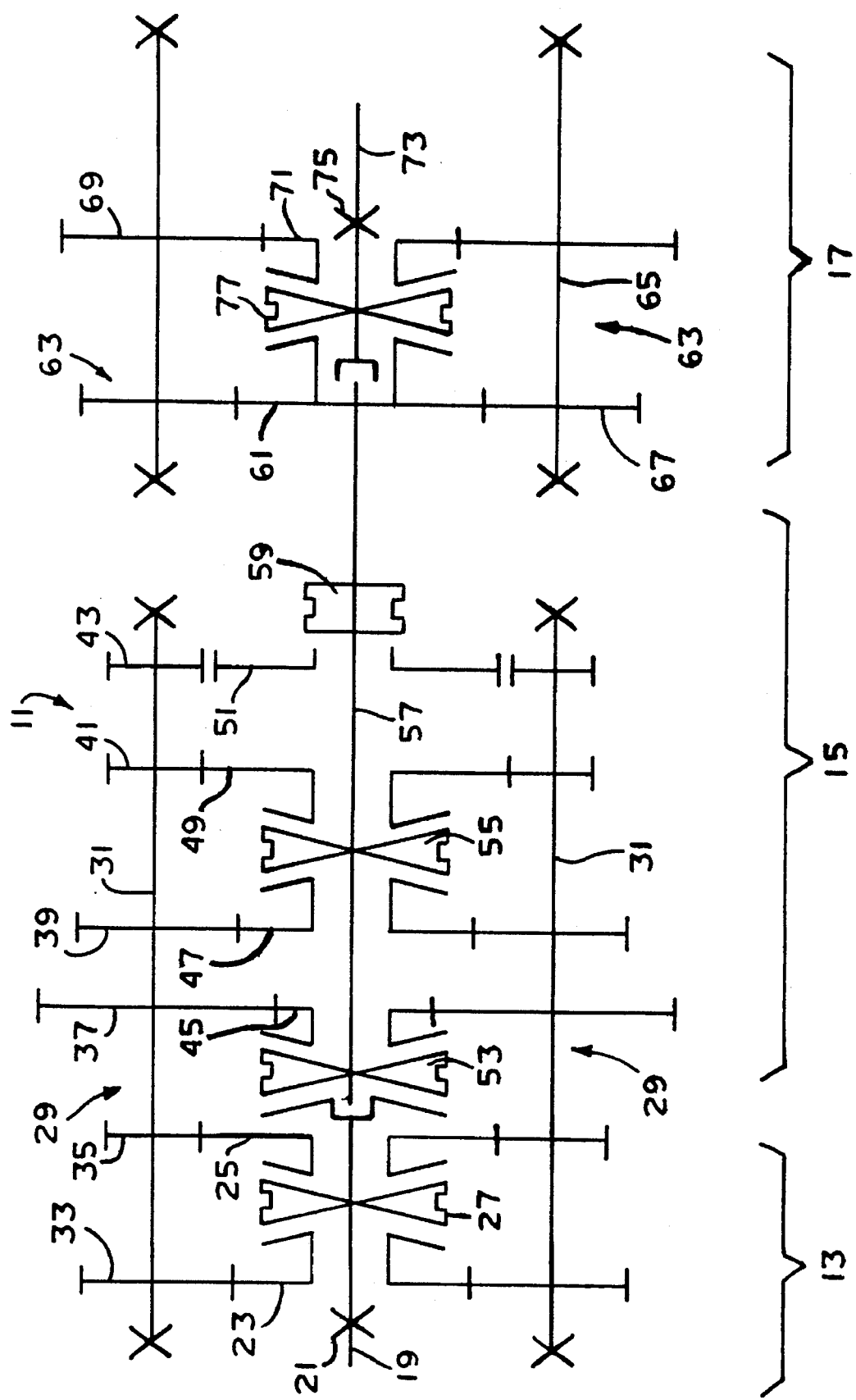
FIG. 1 is a schematic illustration of a compound change gear transmission of the type with which the present invention may be utilized.

Certain terminology will be used in the following description for convenience only and will not be limiting. Certain words such as "upwardly", "downwardly", "rightwardly", and "leftwardly" will designate directions in the drawings to which reference is made. Words such as "forward" and "rearward" will refer respectively to the front and rear ends of the transmission as conventionally mounted in the vehicle, being, respectively, to the left and right of the transmission as illustrated in FIG. 1. Words such as "inwardly" and "outwardly" will refer to directions toward and away from, respectively, the geometric centers of the device and designated parts thereof. Such terminology includes the words above specifically mentioned, as well as derivatives thereof and words of similar import.

The term "compound transmission" is used to designate a change speed or change gear transmission having a main transmission section and an auxiliary transmission section connected in series, whereby the selected gear reduction in the main transmission section may be compounded by further selected gear reduction in the auxiliary transmission section. The term "upshift" as used herein shall mean the shifting from a lower speed gear ratio to a higher speed gear ratio, while the term "downshift" as used herein shall mean the shifting from a higher speed gear ratio to a lower speed gear ratio.

Referring now primarily to FIG. 1, there is a schematic illustration of a sixteen-speed compound transmission 11. The transmission 11 is a "(2)×(4)×(2)" type sixteen-speed transmission having a two-speed splitter section 13, a four forward-speed main section 15 and a two-speed range section 17, all connected in series. The gearing of the transmission 11 may be either of the spur-type or of the helical-type.

Input shaft 19 is supported within the transmission housing forward wall (not shown) by means of a bearing 21, and is surrounded by two input gears 23 and 25, a selected one of which is clutched to the input shaft by a synchronized clutch 27 to provide a two-speed splitter input section.

Front counter shaft assemblies 29 each include a counter shaft 31 carrying counter shaft gears 33, 35, 37, 39, 41, and 43. Gears 33 and 35 are constantly meshed with the input gears 23 and 25, respectively. In the main section 15, the gears 37, 39, 41, and 43 are constantly meshed with main shaft gears 45, 47, 49 and a reverse idler (not shown) is meshed with a reverse main shaft gear 51. Double acting synchronized clutches 53 and 55 are provided on a main shaft 57 to clutch the main shaft 57 to a selected one of the input shaft 19 or main shaft gears 45, 47 or 49. A non-synchronized clutch 59 is used to clutch the reverse main shaft gear 51 to the main shaft 57.

The rearward end of the main shaft 57 extends into the two-speed range section 17 and carries a gear 61 fixed for rotation therewith. A pair of auxiliary section counter shaft assemblies 63 each include an auxiliary section counter shaft 65 carrying two auxiliary section counter shaft gears 67 and 69. Gear 67 is constantly meshed with the auxiliary input gear 61, while the gear 69 is constantly meshed with an output gear 71 surrounding an output shaft 73. The output shaft 73 is supported in the housing rear end wall (not shown) by a bearing 75. A two-position synchronized range clutch 77 is carried by the output shaft 73 and is utilized to clutch either the output gear 71 or the main shaft 57 to the output shaft 73.

Figure 2:
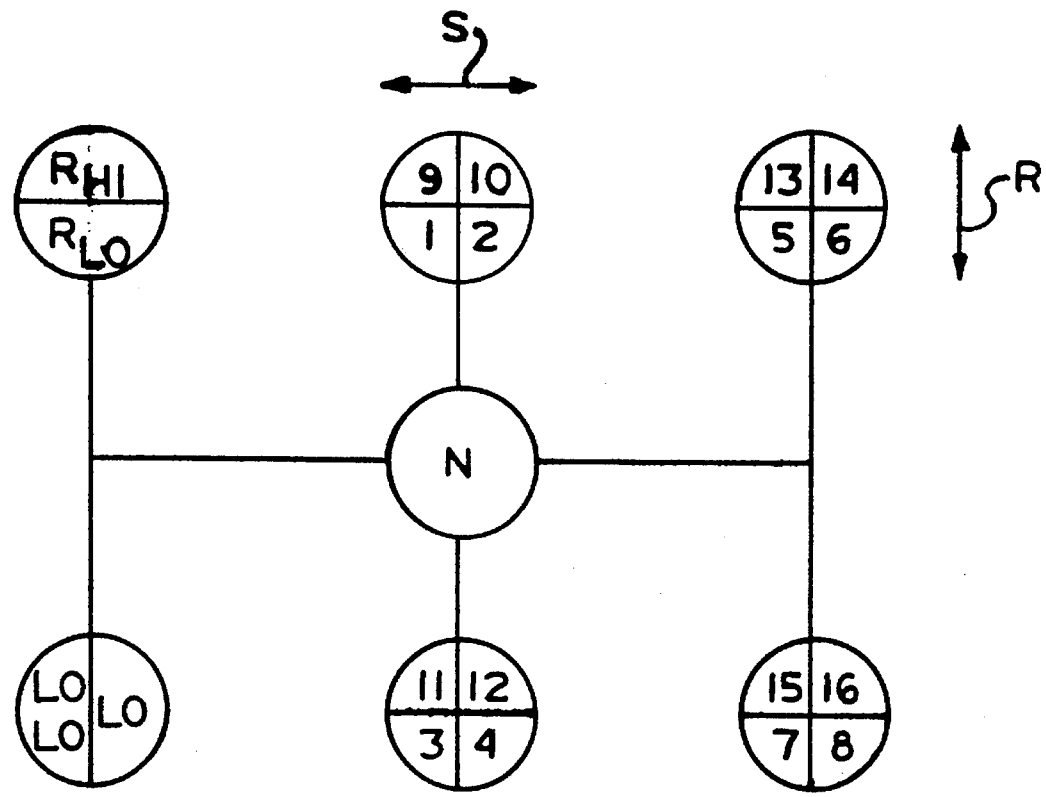
FIG. 2 is a schematic illustration of the shift pattern for the transmission of FIG. 1.

The shift pattern for shifting the transmission 11 is schematically illustrated in FIG. 2 in which divisions in the vertical direction (arrow labelled "R") illustrate shifts of the range section 17, while divisions in the horizontal direction (arrow labelled "S") illustrate shifts of the splitter section 13. However, it will be understood by those skilled in the art that the present invention is not limited to any particular shift pattern, except to the extent specifically recited in the appended claims.

In the subject embodiment of the present invention, the splitter section 13 is located forwardly of the main section 15, but it should be understood by those skilled in the art that the invention is not so limited. Alternatively, the splitter section could be combined with the range section 17 in a single, auxiliary section disposed rearwardly of the main section 15. As another alternative, the present invention could be utilized in a transmission having no splitter section at all, but only the main section 15 and the range section 17.

Figure 3:
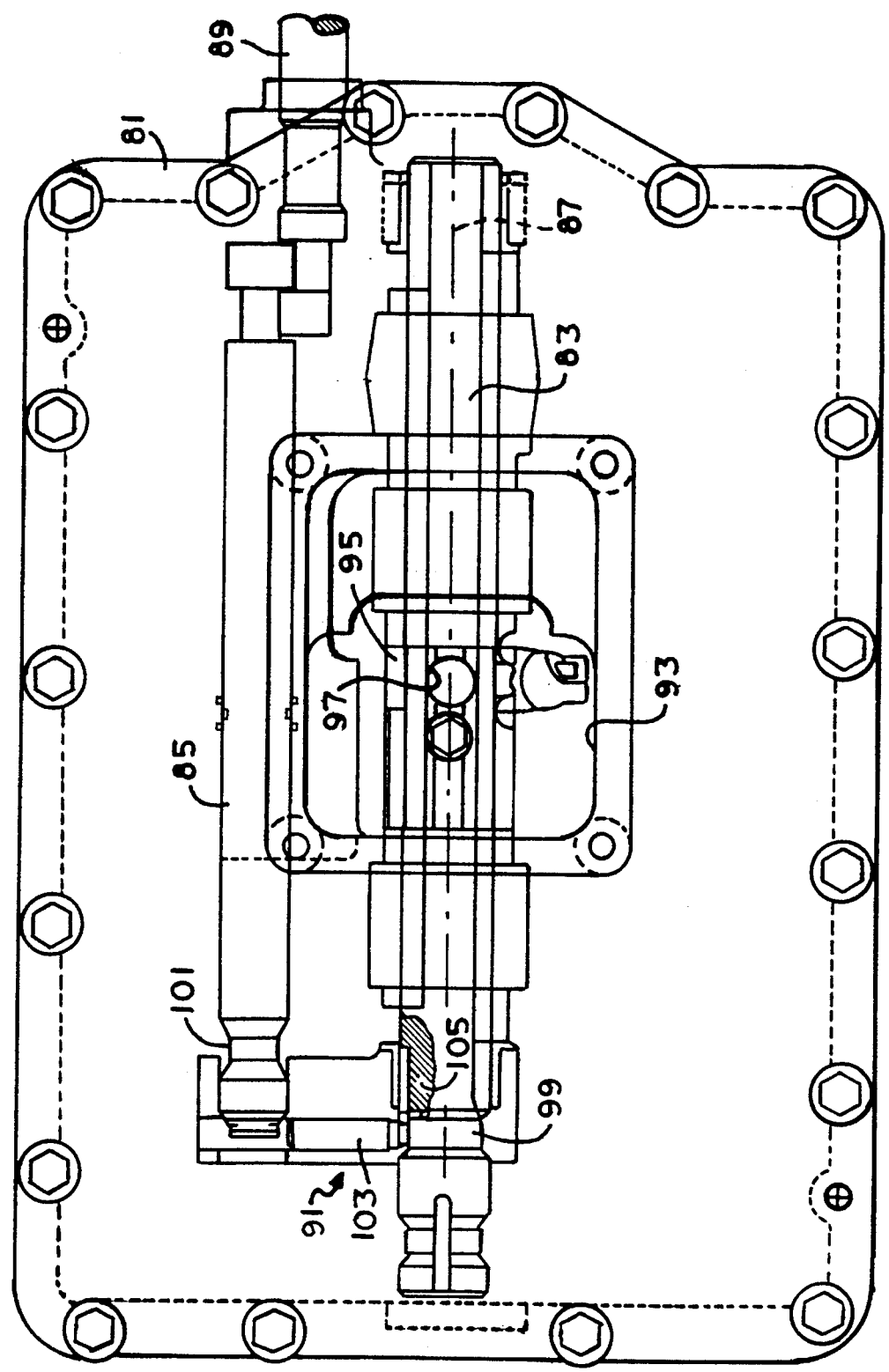
FIG. 3 is a somewhat schematic top view of the shift bar housing assembly of the transmission of the present invention.

Referring now primarily to FIG. 3, there is illustrated a shift control unit for shifting the main section 15 and range section 17. The shift control unit includes a shift bar housing assembly 81 which is mountable on the upper opening of the transmission 11. The shift bar housing 81 supports a first shift bar (also called a "shift rail") 83 and a second shift bar or shift rail 85 for independent axial movement therein. Each of the shift rails 83 and 85 carries a shift fork (not shown herein) for axial movement therewith.

The construction and operation of the shift rail 83 in the subject embodiment is preferably as is set forth in U.S. Pat. No. 4,920,815, assigned to the assignee of the present invention and incorporated herein by reference. Thus, the shift rail 83 is moveable both axially (from right to left and left to right in FIG. 3) and rotationally about an axis 87 of the shift rail 83. The function of the shift rail 83 is to engage the main shaft gears 45, 47, 49 and the reverse main shaft gear 51 to the main shaft 57.

The second shift rail 85 moves only axially, and is operatively associated with a shift rail extension 89 which extends axially out of the shift bar housing 81 and into the range section 17, for operable engagement with the range clutch 77, to select between low range and high range, as was described previously in connection with FIG. 2.

An interlock mechanism, indicated generally at 91 is included to prevent simultaneous movement of the shift rails 83 and 85 from the neutral, centered positions illustrated in FIG. 3, although, in accordance with the present invention, there will be one exception to the "general rule" that both shift rails can't be displaced from their neutral position at the same time.

The shift bar housing 81 is provided with an opening 93 for receipt of a shift finger (not shown) carried by either a standard direct control shift lever or a cross shaft of a remote control mechanism, as is well known to those skilled in the art. The shift rail 83 carries a bushing member 95 fixed for rotational and axial movement therewith and defining a generally upwardly facing socket 97 adapted to receive the lower end of the shift finger, to define a ball and socket type connection therewith.

Figure 4:
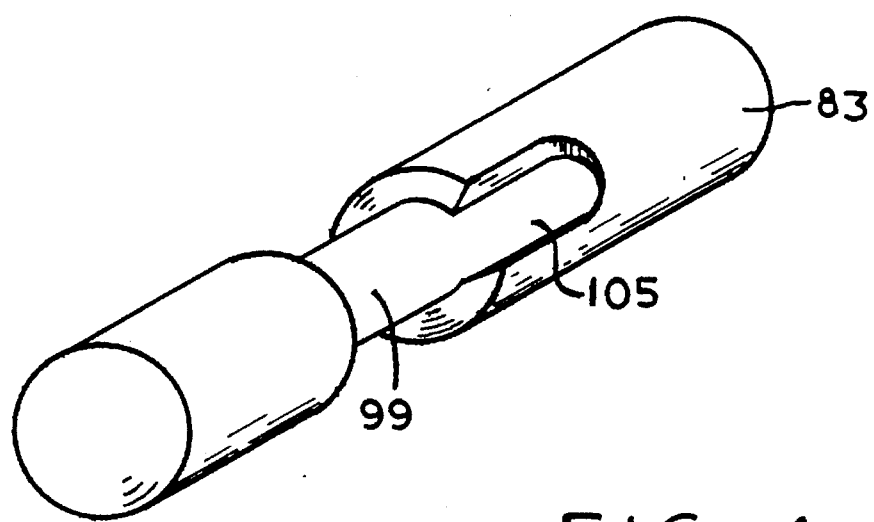
FIG. 4 is a fragmentary, perspective view of a shift rail illustrating one aspect of the present invention.

Referring now primarily to FIGS. 3 and 4, the interlock mechanism 91 will be described in greater detail. The shift rail 83 includes, toward its forward end (left end in FIG. 3), an annular groove 99. Similarly, the shift rail 85 includes, toward its forward end, an annular groove 101 (shown only in FIG. 3). Disposed between the shift rails 83 and 85 is an interlock pin 103, the opposite axial ends of which are preferably beveled or frusto-conical. The shift rail 83 also defines an axial slot 105 which, in the subject embodiment, opens into the annular groove 99 for reasons which will be described subsequently.

The general operation of the interlock mechanism 91 will be understood by reference to above-incorporated U.S. Pat. No. 4,445,393 and 4,944,197. Briefly, with the shift rail 83 in its neutral position shown in FIG. 3, the range section shift rail 85 may be moved axially, in either direction from its neutral position shown in FIG. 3. When the shift rail 85 is moved axially, the upper end of the interlock pin 103 is no longer aligned with the annular groove 101, but instead, now engages one of the full diameters of the shift rail 85. Thus, with the shift rail 85 displaced axially from its neutral position, the interlock pin 103 is forced downward into engagement with the annular groove 99 of the shift rail 83, thus preventing the shift rail 83 from being moved axially to engage one of the synchronized clutches 53 or 55.

As was described in the BACKGROUND OF THE DISCLOSURE, there are certain situations in which it is desired to make a range shift, but such a range shift cannot, as a practical matter, be achieved unless there is some rotation of the main shaft to cause unblocking of the synchronizer in the range section 17.

To accommodate such situations, the axial slot 105 has been provided. As was described previously, actuation of the shift rail 83 to select the various gear ratios in the main section 15 is achieved by moving the shift rail 83 axially and/or rotationally.

In the subject embodiment, the position of the axial slot 105 is on that portion of the shift rail 83 which is disposed adjacent the lower end of the interlock pin 103 whenever the shift rail 83 is moved to engage the clutch 59, and select reverse gear.

Therefore, when for example it is necessary to shift from sixteenth gear (high range) to first gear (low range) the operator can move the shift rail 83 to the axial and rotational position corresponding to reverse gear, as described above. In that position of the shift rail 83, the interlock pin 103 will be disposed within the axial slot 105. Therefore, even though the main section 15 is in a "gear engaged" condition, the fact that the interlock pin 103 is disposed in the axial slot 105 will still permit the shift rail 85 to be moved from its high range position to its low range position. In addition, with the shift rail 83 in the reverse gear position, there is just enough rotation of the main shaft 57 to facilitate the unblocking of the synchronizer in the range section 17.

Once the range section 17 is moved to the low range position, the shift rail 83 can then be moved by the operator from the reverse gear position to the first gear position, in preparation for progressing through the normal shift pattern.

Although the present invention has been described in connection with a main section 15 having a single shift rail 83, it should be understood by those skilled in the art that the invention is not so limited. As an alternative embodiment, and by way of example only, it would be possible to have a main section with a plurality of parallel shift rails and an interlock arrangement between those shift rails and the shift rail associated with the auxiliary section. In such an environment, the shift rail for the main section which is used to select reverse gear would be provided with a notch or a recess or a slot or some other suitable structure disposed adjacent the interlock pin, such that the interlock pin would engage the recess or axial slot, etc. whenever that particular rail selects reverse gear. Then, in much the same manner as was described in connection with the subject embodiment, it would be possible to make the desired shift in the auxiliary section, and having the one particular shift rail in the reverse gear position would result in the necessary rotation of the main shaft 57 to unblock the synchronizer in the auxiliary section and permit the desired shift of the auxiliary section.

Also, although the invention has been described in connection with shifting the main section 15 into reverse gear during the shift of the range section 17, the present invention is not so limited. However, reverse gear would typically be preferred because it results in some rotation of the main shaft 57, but at an extremely low gear ratio. Of course, as will be understood by those skilled in the art, the direction of the rotation of the main shaft 57 is irrelevant, for purposes of the present invention.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A compound change gear transmission of the type including a multiple speed ratio main transmission section and an auxiliary transmission section connected in series; said main transmission section comprising a shift control assembly therefor, including at least a first shift rod axially moveable therein from a neutral, nondisplaced position to engage and disengage, respectively, selected main transmission section gear ratios; said auxiliary transmission section including at least a second shift rod axially moveable therein to engage and disengage selected auxiliary transmission section gear ratios; and a shift rod interlock assembly of the type including an interlock pin member operable between a first position engaging said first shift rod and preventing axial movement thereof from said axially nondisplaced position while permitting axial movement of said second shift rod and a second position engaging said second shift rod and preventing axial movement thereof while permitting axial movement of said first shift rod; characterized by:

(a) said first shift rod having at least one normal position and an interlock deactivation position corresponding to a non-neutral, predetermined gear ratio of said main transmission section; and (b) said first shift rod defining an interlock recess disposed to receive therein said interlock pin member, when said first shift rod is in said interlock deactivation position and in said displaced position, thereby permitting axial movement of said second shift rod.

2. A compound change gear transmission as claimed in claim 1, characterized by said first shift rod defining an annular groove disposed to receive said interlock pin member when said first shift rod is in said neutral, non-displaced position.

3. A compound change gear transmission as claimed in claim 2, characterized by said interlock recess being disposed immediately adjacent and in open communication with said annular groove, whereby movement of said first shift rod from said normal position to said interlock deactivation position results in movement of said interlock pin member, relative to said first shift rod, from said annular groove to said interlock recess.

4. A compound change gear transmission as claimed in claim 3, characterized by said location of said interlock recess, relative to said interlock pin member, corresponds to the movement of said first shift rod to select reverse gear in said main transmission section.

* * * * *